United States Patent [19]

Liu et al.

[11] Patent Number: 4,629,760

[45] Date of Patent: Dec. 16, 1986

[54] COMPOSITION OF POLYCARBONATE, POLYESTER, ACRYLATE ELASTOMERIC COPOLYMER AND A PHENOXY RESIN

[75] Inventors: Ping Y. Liu, Naperville, Ill.; Harold F. Giles, Jr., Cheshire, Mass.

[73] Assignee: General Electric Company, Mt. Vernon, Ind.

[21] Appl. No.: 793,967

[22] Filed: Nov. 1, 1985

[51] Int. Cl.[4] .............................................. C08L 69/00
[52] U.S. Cl. ........................................ 525/67; 525/65; 525/74; 525/133; 525/146; 525/147; 525/148; 525/902; 525/930
[58] Field of Search ............... 525/133, 148, 146, 147, 525/436, 438, 930, 67, 902, 65, 74

[56] References Cited

U.S. PATENT DOCUMENTS

| | | | |
|---|---|---|---|
| 3,480,695 | 11/1969 | Hale | 525/462 |
| 4,456,732 | 6/1984 | Nambu et al. | 525/65 |
| 4,515,918 | 5/1985 | Nouvertné et al. | 524/504 |
| 4,536,538 | 8/1985 | Liu | 524/508 |

Primary Examiner—Theodore E. Pertilla
Attorney, Agent, or Firm—Martin B. Barancik

[57] ABSTRACT

A composition comprising
a. a major amount of an aromatic polycarbonate;
b. a minor quantity of a polyester selected from polyalkylene terephthalate and polycycloalkylene terephthalate, isophthalate or a mixture of the two acids;
c. a minor quantity of an elastomeric acrylate copolymer with a second order transition temperature, Tg, of less than $-10°$ C. and phenoxy resin effective to significantly maintain the impact strength and ductility at break after exposing a stressed part to brake fluid comprising alcohols and ethers.

20 Claims, No Drawings

COMPOSITION OF POLYCARBONATE, POLYESTER, ACRYLATE ELASTOMERIC COPOLYMER AND A PHENOXY RESIN

BACKGROUND OF THE INVENTION

Aromatic carbonate polymers are well known, commercially available materials having a variety of applications in the plastics art. Such carbonate polymers may be prepared by reacting a dihydric phenol, such as 2,2-bis(4-hydroxyphenyl)propane, with a carbonate precursor, such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength (except in thick molded sections), and a dimensional stability surpassing that of many other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane no lead gasoline, acetone, heptane and carbon tetrachloride as well as basic type solvents such as alcohols, amines and the like when such solvents are in contact with stressed parts fabricated from aromatic polycarbonate resin. The most significant effect is a loss in vital impact strength and an increased brittle type failure in the standard Notched Izod test system. Contact with such solvent may occur depending upon the application to which the compositions are being applied. Certain formulations of polycarbonate have been devised which increases the resistance of polycarbonate to environmental stress cracking, for example polycarbonate and a minor amount of a polyalkylene terephthalate such as polyethylene terephthalate or polybutylene terephthalate. However these formulations generally have a significantly lowered thin section impact resistance compared to polycarbonate itself. Impact modifiers such as acrylates and polyolefins are often times added to such formations to bring about increased impact resistance.

It has been recently discovered that the addition of an acrylate elastomer and a phenoxy resin to a major amount of an aromatic polycarbonate retained impact strength and ductility when exposed under test conditions to a standard brake fluid comprising primarily ethers and alcohols. The same compositions did not perform well when exposed to a high aromatic gasoline under the same test conditions, see our earlier filed U.S. Ser. No. 747,784, filed June 24, 1985. It has now been found that such a combination of acrylate elastomer and phenoxy resin will provide similar impact resistance characteristics to an aromatic polycarbonate-polyalkylene terephthalate blend. Additionally, the presence of a further impact modifier, an olefin acrylate, does not significantly adversely affect the retention of impact resistance in an alcohol and amine system of the stressed fabricated part as long as the weight of acrylate elastomer exceeds the weight of olefin acrylate by more than about two to one.

SUMMARY OF THE INVENTION

In accordance with the invention, there is a composition comprising a major amount of an aromatic polycarbonate, a minor amount of a polyester selected from the group consisting of polyalkylene terephthalate and polycycloalkylene terephthalate, isophthalate or mixtures of terephthalate and isophthalate, and minor quantities of both an acrylate elastomeric copolymer with a second order transition temperature, Tg, of less than $-10°$ C. and a phenoxy resin, the quantities of both the said acrylate elastomeric copolymer and phenoxy resin such that the impact strength and ductility in a Notched Izod test system is substantially maintained after exposing a stressed part to brake fluid comprising alcohols and ethers.

A further aspect of the invention is that even with an olefin-acrylate copolymer present in the composition, the impact strength and ductility of a Notched Izod test system is substantially maintained after exposing a stressed part to brake fluid comprising alcohols and ethers when the olefin acrylate quantity is less than fifty (50) weight percent of the acrylate elastomeric copolymer.

Another aspect of the invention is a composition comprising a. about 51 to 84 weight percent of an aromatic polycarbonate;

b. about 8 to about 20 weight percent of a polyalkylene terephthalate or polycycloalkylene terephthalate, isophthalate or a mixture of isophthalate and terephthalate;

c. about 5 to about 15 weight percent of an acrylate elastomeric copolymer with a second order transition temperature, Tg of less than $-10°$ C.;

d. about 3 to about 14 weight percent of a phenoxy resin.

A still further aspect of the invention is a composition wherein an olefin acrylate copolymer is present in less than 50 weight percent quantities of the elastomeric acrylate copolymer.

DESCRIPTION OF THE INVENTION

The aromatic polycarbonates useful in the invention are typified as possessing recurrent structural units of the formula:

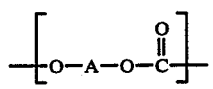

Formula 1 wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are 2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;

1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention copolyestercarbonates as disclosed in Goldberg U.S. Pat. No. 3,169,121 are also included within the term polycarbonate. Branched polycarbonates are also useful. To avoid unnecessarily detailed description, the disclosures of U.S. Pat. Nos. 3,028,365; 3,334,154; 4,001,184 and 4,131,575 are incorporated herein by reference. In any event, the preferred aromatic carbonate polymer is a homopolymer derived from 2,2-bis(4-hydroxyphenyl)propane (bisphenol-A).

In short, the dihydric phenol is preferably represented by the formula

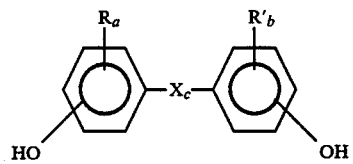

Formula 2 wherein R and R' are the same or different and are alkyl of one to form carbon atoms, inclusive, preferably one to three, and halogen, preferably chloro or bromo.

The letters a and b are the same or different and are an integer of 0, 1, 2, 3 or 4, preferably 0, 1 or 2.

X is selected from alkylene of two to ten carbon atoms, inclusive, alkylidene of one to ten carbon atoms, inclusive, cycloalkylene of four to twelve carbon atoms, inclusive, cycloalkylidene of four to twelve carbon atoms, inclusive,

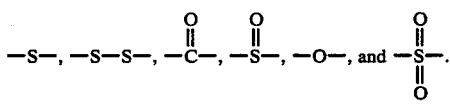

c is 0 or 1.

The polyalkylene terephthalate resins for use herein are well known and generally have an alkylene unit of from two to about ten carbon atoms. Alkylene units of two (ethylene) and four (butylene) carbon atoms are preferred. Any of the alkylene units can be replaced by a cycloalkylene unit, thereby having polycycloalkylene units of anywhere from one to 100 mole percent. Isophthalate units may also replace terephthalate units, independently of the quantity of alkylene units replaced. Cycloalkylene groups of from four to seven ring carbon atoms are preferred. However, the most preferred cycloalkylene group is trans 1,4-cyclohexane dimethylene, derived from trans 1,4-cyclohexane dimethanol in the polymeric condensation reaction. These groups of polymer are obtained from Eastman Kodak as part of their Kodar ® series and range, for example, from A150 which is all trans 1,4-cyclohexane dimethanol reacted with a combination of isophthalic and terephthalic acids, to PCTG which is 80 mole percent trans 1,4-cyclohexane dimethanol, 20 mole percent ethylene with terephthalic acid to PETG which is 80 mole percent ethylene, 20 mole percent trans 1,4-cyclohexane dimethanol with terephthalic acid. The preferred resin is polyethylene terephthalate.

The acrylate elastomeric copolymer having a second order transition temperature, Tg of less than $-10°$ C., preferably less than $-40°$ C., is any copolymer having a sufficient amount of a $C_1$-$C_6$ acrylate to provide elastomeric qualities. Examples of the acrylate ester groups include methyl, ethyl, propyl, n-butyl, n-pentyl, n-hexyl and isomers thereof such as isopropyl. N-butyl is preferred.

As a comonomer together with the acrylate can be other unsaturated monomers which will still provide an elastomeric molecule, for example, an acrylonitrile, a styrene and an alkacrylate such as a methacrylate. Grafted copolymers are specifically included. Examples of such polymers include acrylonitrile styrene acrylate (ASA), and methacrylate butadiene styrene (MABS). Preferred are core-shell polymers of the multiphase composite interpolymer type. Of these the core shell type, also known as multiphase composite interpolymer, described in U.S. Pat. No. 4,096,202, incorporated by reference, are particularly preferred.

Multiphase composite interpolymer is an interpolymer comprising about 25 to 95 percent by weight of a first elastomeric phase and about 75 to 5 percent by weight of a final rigid thermoplastic phase. One or more intermediate phases are optional, for example, a middle stage polymerized from about 75 to 100 percent by weight styrene.

The first stage of multiphase composite interpolymer is polymerized from about 75 to 99.8 weight percent $C_1$ to $C_6$ alkyl acrylate resulting in an acrylic rubber core having a Tg below about $-10°$ C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like, di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization, and consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid itaconate. Somewhat less preferred are the diallylesters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as graftlinking agent with a final stage polymerized from about 60 to 100 percent by weight methyl methacrylate. A preferred two stage interpolymer of this type is commercially available under the tradename, ACRYLOID KM 330, from Rohm & Haas Chemical Company.

The final stage monomer system can be comprised of $C_1$ to $C_6$ methacrylate, styrene, acrylonitrile, alkyl acrylates, allyl methacrylate, diallyl methacrylate, and the like, as long as the overall Tg is at least 20° C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl, amino and amide groups.

The phenoxy resin is a resin obtained by the reaction of a dihydric phenol of the general type shown in Formula 2 with an epichlorohydrin to produce a polymer having recurring units of the general formula Formula 3

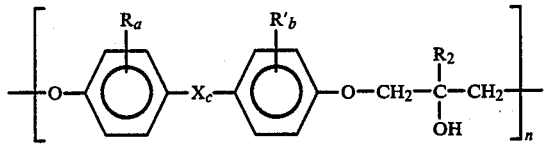

wherein R, R', a, b, c and X are defined as in Formula 2, the hydroxys are fixed para to the X substituent, $R_2$ is hydrogen or an alkyl of one to six carbon atoms, inclusive, and n is an integer of 3 to 200, preferably from about 75 to 190. The preferred dihydric phenol is bisphenol-A. The preferred $R_2$ is hydrogen.

The olefin acrylate copolymer if present in the composition is made from an olefin, e.g., ethylene, propylene, or the like, copolymerized with one or more of a comonomer comprising a $C_1-C_6$ alkyl acrylate, e.g., methyl acrylate, ethyl acrylate, hexyl acrylate, and the like; a $C_1-C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are described in U.S. Pat. No. 2,953,551, which is hereby incorporated herein by reference. Generally, the acrylate or methacrylate portion of the copolymer can range from about 10 to about 30 weight percent. The olefin portion of the copolymer can range from about 70 to about 90 weight percent. The preferred copolymer for use as component (iv) is an ethylene ethyl acrylate copolymer, preferably one in which the weight ratio of the ethylene fraction to the ethyl acrylate fraction is about 4.5 to 1. Suitable olefin acrylate copolymers, as defined hereinafore, can be prepared by methods well known in the art or can be obtained commercially, as for example from Union Carbide. Union Carbide's Bakelite DPD-6169 ethylene ethyl acrylate copolymer is suitable for use in the instant invention.

The polycarbonate is a major quantity of the composition. Generally a composition comprising about 51 to 84 weight percent of an aromatic polycarbonate, about 8 to 20 of a polyester resin such as polyethylene terephthalate, about 5 to 15 of an elastomeric acrylate copolymer, about 3 to 14 of a phenoxy resin, all percentages measured by the polycarbonate, polyester, elastomeric copolymer and phenoxy total composition is a preferred composition. More preferred is polycarbonate of about 56 to 80 weight percent, polyester of about 10 to 18 weight percent, elastomeric acrylate copolymer about 6 to 14 weight percent, phenoxy of about 4 to 12 weight percent.

When an olefin acrylate copolymer is present in the composition it should be from about 1.0 to 4.0 weight percent of the sum of polycarbonate, polyester, elastomeric acrylate copolymer, phenoxy resin and olefin acrylate total composition, preferably about 1.2 to 3.6.

As measured in weight percent of the elastomeric, acrylate copolymer, the olefin acrylate copolymer is preferably less than forty (40) percent and more preferably less than thirty-five (35) percent of the weight.

Other additives, stabilizers and fillers usually associated with polycarbonate can also be present in the composition. Examples of such materials include thermal stabilizers, hydrolytic stabilizers, ultraviolet stabilizers, antioxidants, flame retardant additives, glass fibers, carbon fibers, carbon blacks, pigments, dyes and the like.

In the examples below the polycarbonate employed is either LEXAN® 145, a medium low viscosity bisphenol-A polycarbonate, I.V.=0.46–0.49 in $MeCl_2$ at 30° C. or LEXAN® 105, a medium high viscosity bisphenol-A polycarbonate, I.V.=0.52–0.56 in $MeCl_2$ at 30° C. or a combination of the two resins. The elastomeric acrylate copolymer is Acryloid KM 330 available from Rohm and Haas. This polymer is about 79.2 wt. % n-butylacrylate, 20 wt. % methylmethacrylate, 0.4 wt. % 1,3 butylene diacrylate and 0.4 wt. % dialkyl maleate. The phenoxy resin is UCAR® PKHH resin available from Union Carbide wherein bisphenol-A is the dihydric phenol and $R_2$ is hydrogen. The olefin acrylate copolymer is ethylene ethylacrylate obtained from Union Carbide as Bakelite DPD6169. The polyethylene terephthalate is Tenite 7352 obtained from Eastman Chemical Company.

The composition was extruded at 230° C. and the Izod bars of dimensions 63.5 mm×12.7 mm×3.2 mm and 63.5 m×12.7 m×6.4 mm molded at 230° C. The Izod bars were tested for Notched Izod (impact testing) under ASTM D260. Additionally the compositions were tested for DTUL according to ASTM D648. Further, the Izod bars were soaked for two hours in Prestone® DOT 3 super heavy duty polyglycol based hydraulic brake fluid on a stress jig at a pressure of 240 kgf/cm². The analysis of the Prestone®, available from Union Carbide, is below. After drying the Izod bars were tested for impact strength under ASTM D260. The superscript gives the percent ductility at break. No superscript means 100% ductile.

| COMPOSITION OF SAE COMPATABILITY FLUID | |
|---|---|
| CONSTITUENT | COMPOSITION WT. % |
| 1. Monoethyl ether of diethylene glycol | 51.70 |
| 2. Monobutyl ether of diethylene glycol | 2.26 |
| 3. Methyl ether of tripropylene glycol | 5.12 |
| 4. Polyalkylene oxide triol viscosity 900 ± SUS at 38° C. (100° F.); (200 ± 10 cSt at 38° C. (100° F.); sp gr 1.064 20/20° C.[b] | 5.30 |
| 5. Ethylene glycol | 2.47 |
| 6. Diethylene glycol | 1.34 |
| 7. Propylene glycol | 2.45 |
| 8. Methyl isobutyl carbinol | 4.30 |
| 9. Polypropylene glycol 2025 MW | 2.30 |
| 10. Polypropylene glycol 120 MW | 1.30 |
| 11. Propylene glycol monoricinoleate | 3.30 |
| 12. Reacted castor oil-polypropylene glycol | 1.90 |
| 13. 2-methyl, 2,4 pentanediol | 2.80 |
| 14. Monobutyl ether 1,2 oxyethylene, 1,2 oxypropylene glycols sp gr 1.058 20/20° C.; viscosity 2000 ± 100 SUS at 38° C. (100° F.); (440 ± 22 cSt at 38° C. (100° F.)[c] | 3.16 |
| 15. Monobutyl ether 1,2 oxyethylene, 1,2 oxypropylene glycols sp gr 1.038 20/20° C.; viscosity 260 ± 15 SUS at 38° C. (100° F.); (56.5 ± 3 cSt at 38° C. (100° F.)[c] | 8.85 |
| 16. Borax-ethylene glycol condensate (25% sodium tetraborate, anhydrous) | 0.25 |
| 17. Diphenylol propane | 0.53 |
| 18. Sodium nitrate | 0.01 |
| 19. Sodium tetraborate | 0.10 |
| 20. Potassium tetraborate | 0.18 |
| 21. Tricresyl phosphate | 0.10 |
| 22. Amino imidazoline salt 33% solution | 0.01 |
| 23. Potassium castor oil soap (neutral-anhydrous) | 0.18 |
| 24. N—phenylmorpholine | 0.09 |
| TOTAL | 100.00 |

[a]Obtainable from the Society of Automotive Engineers, Inc. 400 Commonwealth Drive, Warrendale, PA 15096.
[b]Glycerin initiated trial using 50—50 charge ethylene oxide and propylene oxide.
[c]Butanol initiated monoether using 50—50 charge ethylene oxide and propylene oxide.

As shown in the Table below the resistance of the composition to high octane aromatic containing gasoline exposure is not high. The composition was soaked in high octane aromatic containing gasoline for two hours on a jig at a pressure of 240 Kgf/cm². Below are the results.

TABLE 2

| | NOTCHED IZOD Kgf cm/cm | | | |
|---|---|---|---|---|
| | 3.2 mm | | 6.4 mm | |
| COMPOSITION | AS IS | GAS | AS IS | GAS |
| Example 1 | 87.1 | 18.5 | 75.7 | 10.9 |
| Example 2 | 89.3 | 20.7 | 75.1 | 12.5 |

What is claimed is:
1. A composition comprising
  a. a major amount of an aromatic polycarbonate;
  b. a minor quantity of a polyester selected from polyalkylene terephthalate and polycycloalkylene terephthalate, isophthalate or a mixture of the isophthalate and terephthalate;
  c. a minor quantity of an elastomeric acrylate copolymer with a second order transition temperature, Tg, of less than −10° C. and phenoxy resin effective to significantly maintain the impact strength and ductility at break after exposing a stressed part to brake fluid comprising alcohols and ethers.
2. The composition in accordance with claim 1 wherein the aromatic polycarbonate is bisphenol-A polycarbonate.
3. The composition in accordance with claim 1 wherein the copolymer is primarily a rubbery acrylate.
4. The composition in accordance with claim 3 wherein the acrylate is n-butylacrylate.
5. The composition in accordance with claim 3 wherein the copolymer is a multiphase composite interpolymer.
6. The composition in accordance with claim 1 wherein the phenoxy resin is of the formula

TABLE I

| | COMPOSITIONS (WT. %) | | | | | | NOTCHED IZOD (Kg.f cm/cm) | | | |
|---|---|---|---|---|---|---|---|---|---|---|
| | | | | | ETHYLENE | | | 3.2 mm | | 6.4 mm |
| SAMPLE | LEXAN ® 105 | LEXAN ® 145 | PET | KM330 | ETHYL ACRYLATE | PHENOXY | DTUL °C. | AS IS | BRAKE FLUID | AS IS | BRAKE FLUID |
| Control | | | | | | | | | | | |
| 1 | 44.1 | 29 | 14 | 5.2 | 2.6 | 5 | 116 | 63.1 | broke | — | — |
| 2 | 39.0 | 29 | 14 | 5.2 | 2.6 | 10 | 117 | 68.0 | broke | — | — |
| Example | | | | | | | | | | | |
| 1 | 44.1 | 29 | 14 | 5.4 | 1.8 | 5 | 122 | 87.1 | 65.9 | 75.7 | — |
| 2 | 39.1 | 29 | 14 | 5.4 | 1.8 | 10 | 118 | 89.3 | 76.7 | 75.1 | — |
| 3 | 39.5 | 29 | 14 | 6.0 | 1.5 | 10 | 114 | 88.7 | 71.3 | 66.4 | 65.3 |
| 4 | — | 68.5 | 14 | 6.0 | 1.5 | 10 | 114 | 87.1 | 72.4 | 66.4 | 57.7 |
| 5 | 68.5 | — | 14 | 6.0 | 1.5 | 10 | 117 | 85.5 | 85.5 | 72.9 | 65.2 |

As is readily observed from the data, not even the phenoxy resin and the elastomeric acrylate copolymer together can maintain the impact resistance of the composition after exposure to the brake fluid when ethylene ethylacrylate is present in 50 weight percent quantities of the elastomeric acrylate comonomer. It is only when the ethylene ethylacrylate weight percent, as measured by the elastomeric acrylate copolymer, is significantly reduced, to 33% and even 25% of the elastomeric acrylate copolymer that significant maintenance of the impact resistance after exposure to brake fluid is achieved.

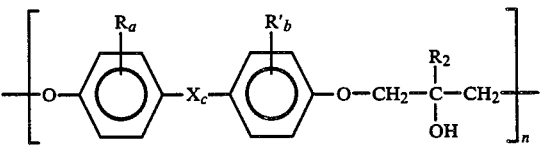

where
R and R' are the same or different and are alkyl of one to four carbon atoms, inclusive or halogen;
a and b are the same or different and are an integer of 0, 1, 2, 3 or 4;

X is alkylene of two to ten carbon atoms, inclusive; alkylidene of one to ten carbon atoms, inclusive; cycloalkylene of four to twelve carbon atoms, inclusive; cycloalkylidene of four to twelve carbon atoms, inclusive;

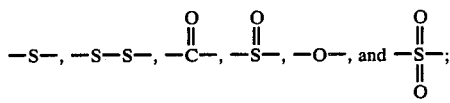

c is 0 or 1; and
n is 3 to 200.

7. The composition in accordance with claim 1 wherein the polycarbonate is from about 51 to 84 wt. percent, the acrylate elastomer is from about 5 to 15 wt. percent, the polyester is from about 8 to 20 wt. percent and the phenoxy resin is from about 3 to 14 wt. percent.

8. The composition in accordance with claim 6 wherein a and b are zero, c is one, X is 2,2'-propylidene, $R_2$ is hydrogen and n is about 75 to 190.

9. The composition in accordance with claim 8 wherein the aromatic polycarbonate is bisphenol-A polycarbonate.

10. The composition in accordance with claim 9 wherein the acrylate elastomer is a multiphase composite interpolymer wherein the core comprises n-butylacrylate and the shell comprises methyl methacrylate.

11. The composition in accordance with claim 10 wherein the bisphenol-A polycarbonate is about 56 to 80 wt. percent, the acrylate elastomer is about 6 to 14 wt. percent, the polyester is about 10 to 18 wt. percent and the phenoxy resin is about 4 to 12 wt. percent.

12. A composition comprising about 51 to 84 wt. percent of an aromatic polycarbonate, about 3 to 14 wt. percent phenoxy resin, about 8 to 20 wt. percent polyester and about 5 to 15 wt. percent of an acrylate elastomeric copolymer with a secondary transition temperature, Tg, of less than −10° C.

13. The composition in accordance with claim 1 wherein an olefin acrylate copolymer is present in quantities which are less than 50 percent of the weight of the elastomeric acrylate copolymer.

14. The composition in accordance with claim 13 wherein the olefin acrylate is ethylene ethylacrylate.

15. The composition in accordance with claim 14 wherein ethylene ethylacrylate is less than 40 percent of the weight of the elastomeric acrylate copolymer.

16. The composition in accordance with claim 15 wherein the aromatic polycarbonate is bisphenol-A polycarbonate.

17. The composition in accordance with claim 16 wherein the polyester is polyethylene terephthalate.

18. The composition in accordance with claim 17 wherein the elastomeric acrylate copolymer is a multiphase composite interpolymer.

19. The composition in accordance with claim 18 wherein the phenoxy resin is of the formula

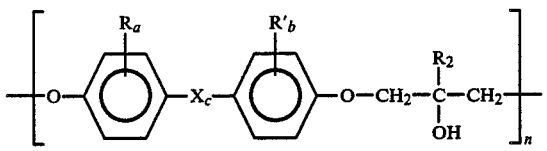

where
R and R' are the same or different and are alkyl of one to four carbon atoms, inclusive or halogen;
a and b are the same or different and are an integer of 0, 1, 2, 3 or 4;
X is alkylene of two to ten carbon atoms, inclusive; alkylidene of one to ten carbon atoms, inclusive; cycloalkylene of four to twelve carbon atoms, inclusive; cycloalkylidene of four to twelve carbon atoms, inclusive;

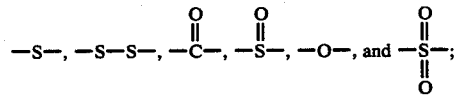

c is 0 or 1; and
n is 3 to 200.

20. The composition in accordance with claim 19 wherein a and b are zero, c is one, X is 2,2-propylidene, $R_2$ is hydrogen and n is about 75 to 190.

* * * * *

UNITED STATES PATENT AND TRADEMARK OFFICE
CERTIFICATE OF CORRECTION

PATENT NO. : 4,629,760

DATED : December 16, 1986

INVENTOR(S) : Ping Y. Liu and Harold F. Giles, Jr.

It is certified that error appears in the above-identified patent and that said Letters Patent is hereby corrected as shown below:

Column 7, line 12, "45" is missing after 900 $\pm$ - should be -

4. Polyalkylene oxide triol viscosity 900 $\pm$ 45 SUS

Signed and Sealed this

Sixteenth Day of February, 1988

Attest:

DONALD J. QUIGG

*Attesting Officer*          *Commissioner of Patents and Trademarks*